(12) United States Patent
Bates et al.

(10) Patent No.: US 6,585,929 B1
(45) Date of Patent: Jul. 1, 2003

(54) DIRECT SMELTING VESSEL

(75) Inventors: Cecil Peter Bates, Mt. Pleasant (AU);
Peter Damian Burke, Winthrop (AU);
Rodney James Dry, City Beach (AU)

(73) Assignee: Technological Resources Pty Ltd,
Melbourne (AU)

( * ) Notice: Subject to any disclaimer, the term of this patent is extended or adjusted under 35 U.S.C. 154(b) by 0 days.

(21) Appl. No.: 09/587,774

(22) Filed: Jun. 6, 2000

(30) Foreign Application Priority Data

Jun. 8, 1999 (AU) .............................................. PQ0835

(51) Int. Cl.⁷ ................................................. C21B 7/00

(52) U.S. Cl. ...................................... 266/158; 266/171

(58) Field of Search ................................ 266/144, 158, 266/159, 172, 171

(56) References Cited

U.S. PATENT DOCUMENTS

| | | |
|---|---|---|
| 2,647,045 A | 7/1953 | Rummel |
| 3,844,770 A | 10/1974 | Nixon |

(List continued on next page.)

FOREIGN PATENT DOCUMENTS

| | | |
|---|---|---|
| AU | A-23864/84 | 1/1984 |
| AU | B-41064/85 | 4/1986 |
| AU | B-69707/87 | 9/1987 |
| AU | B-22448/88 | 5/1989 |
| AU | B-26831/88 | 7/1989 |
| AU | B-28802/89 | 8/1989 |
| AU | A-42859/89 | 4/1990 |
| AU | A-49307/90 | 9/1990 |
| AU | A-49309.90 | 9/1990 |
| AU | B-74840/91 | 10/1991 |
| AU | B-90957/91 | 8/1992 |
| AU | A-48938/93 | 4/1994 |
| AU | B-48937/93 | 5/1994 |
| AU | B-50820/96 | 1/1997 |
| DE | 3139375 | 4/1983 |
| DE | 3244744 | 5/1984 |
| EP | 079 182 A1 | 5/1983 |
| EP | 084 288 A1 | 7/1983 |
| EP | 422 309 A1 | 4/1991 |
| EP | 541 269 A1 | 5/1993 |
| EP | 592 830 A1 | 4/1994 |
| EP | 657 550 | 6/1995 |

(List continued on next page.)

OTHER PUBLICATIONS

Patent Abstract of Japan, JP, A, 10–280020 (Nippon Steel Corp.), Oct. 20, 1998.
Patent Abstracts of Japan, C–951, p. 24, JP, A, 04–63218 (Kawasaki Heavy Ind. Ltd), Feb. 28, 1992.
Patent Abstracts of Japan, C–627, p. 109, Jp, A, 01–127613 (Kawasaki Steel Corp.), May 19, 1989.
1995, WPAT print–out for Brazilian patent application PI9400123–5 (Weber) No Date.
Patent Abstracts of Japan, C–951, JP, A, 4–63217 (Kawasaki Heavy Ind. Ltd.), Feb. 28, 1992.
Patent Abstracts of Japan, C–497, p. 115, JP, A, 62–280315 (Nippon Kokan K.K), Dec. 15, 1987.
Derwent Abstract Accession No. 87–039748/06 JP, A, 61–295334, Dec. 26, 1986.

*Primary Examiner*—Scott Kastler
(74) *Attorney, Agent, or Firm*—Merchant & Gould, P.C.

(57) ABSTRACT

A direct smelting vessel which is adapted to contain a molten bath of metal and slag is disclosed. The vessel includes an off-gas duct that has:

(a) a first section which has a relatively slight upward inclination to the horizontal from an inlet end of the first section; and (b) a second section which extends upwardly from an upper end of the first section at a relatively steep inclination to the horizontal.

17 Claims, 2 Drawing Sheets

U.S. PATENT DOCUMENTS

| | | | |
|---|---|---|---|
| 3,845,190 A | | 10/1974 | Yosim et al. |
| 3,888,194 A | | 6/1975 | Kishigami et al. |
| 3,890,908 A | | 6/1975 | von Klenck et al. |
| 3,894,497 A | | 7/1975 | Helke et al. |
| 4,007,034 A | | 2/1977 | Hartwig et al. |
| 4,053,301 A | | 10/1977 | Stephens, Jr. |
| 4,083,715 A | * | 4/1978 | Langhammer ............... 266/168 |
| 4,145,396 A | | 3/1979 | Grantham |
| 4,177,063 A | | 12/1979 | Dickson |
| 4,207,060 A | | 6/1980 | Zangs |
| 4,356,035 A | | 10/1982 | Brotzmann et al. |
| 4,389,043 A | | 6/1983 | Weber et al. |
| 4,400,936 A | | 8/1983 | Evans |
| 4,402,274 A | | 9/1983 | Meenan et al. |
| 4,431,612 A | | 2/1984 | Bell et al. |
| 4,447,262 A | | 5/1984 | Gay et al. |
| 4,455,017 A | | 6/1984 | Wunsche |
| 4,468,298 A | | 8/1984 | Byrne et al. |
| 4,468,299 A | | 8/1984 | Byrne et al. |
| 4,468,300 A | | 8/1984 | Byrne et al. |
| 4,481,891 A | | 11/1984 | Takeshita et al. |
| 4,504,043 A | | 3/1985 | Yamaoka et al. |
| 4,511,396 A | | 4/1985 | Nixon |
| 4,521,890 A | * | 6/1985 | Burnham et al. ............. 373/22 |
| 4,565,574 A | | 1/1986 | Katayama et al. |
| 4,566,904 A | | 1/1986 | von Bogdandy et al. |
| 4,572,482 A | | 2/1986 | Bedell |
| 4,574,714 A | | 3/1986 | Bach et al. |
| 4,602,574 A | | 7/1986 | Bach et al. |
| 4,664,618 A | | 5/1987 | Gitman |
| 4,681,599 A | | 7/1987 | Obkircher |
| 4,684,448 A | | 8/1987 | Itoh et al. |
| 4,701,214 A | | 10/1987 | Kaneko et al. |
| 4,718,643 A | | 1/1988 | Gitman |
| 4,786,321 A | | 11/1988 | Hoster et al. |
| 4,790,516 A | | 12/1988 | Sugiura et al. |
| 4,798,624 A | | 1/1989 | Brotzmann et al. |
| 4,836,847 A | * | 6/1989 | Bishop et al. ................. 75/25 |
| 4,849,015 A | | 7/1989 | Fassbinder et al. |
| 4,861,368 A | | 8/1989 | Brotzmann et al. |
| 4,874,427 A | | 10/1989 | Hamada et al. |
| 4,890,562 A | | 1/1990 | Gitman |
| 4,913,734 A | | 4/1990 | Romenets et al. |
| 4,923,391 A | | 5/1990 | Gitman |
| 4,940,488 A | | 7/1990 | Maeda et al. |
| 4,946,498 A | | 8/1990 | Weber |
| RE33,464 E | | 11/1990 | Gitman |
| 4,976,776 A | | 12/1990 | Elvander et al. |
| 4,999,097 A | | 3/1991 | Sadoway |
| 5,005,493 A | | 4/1991 | Gitman |
| 5,024,737 A | | 6/1991 | Claus et al. |
| 5,037,608 A | | 8/1991 | Tarcy et al. |
| 5,042,964 A | | 8/1991 | Gitman |
| 5,050,848 A | | 9/1991 | Hardie et al. |
| 5,051,127 A | | 9/1991 | Hardie et al. |
| 5,065,985 A | | 11/1991 | Takahashi et al. |
| 5,177,304 A | | 1/1993 | Nagel |
| 5,191,154 A | | 3/1993 | Nagel |
| 5,222,448 A | | 6/1993 | Morgenthaler et al. |
| 5,238,646 A | | 8/1993 | Tarcy et al. |
| 5,271,341 A | | 12/1993 | Wagner |
| 5,279,715 A | | 1/1994 | La Camera et al. |
| 5,301,620 A | | 4/1994 | Nagel et al. |
| 5,302,184 A | | 4/1994 | Batterham et al. |
| 5,322,547 A | | 6/1994 | Nagel et al. |
| 5,332,199 A | | 7/1994 | Knapp et al. |
| 5,333,558 A | | 8/1994 | Lees, Jr. |
| 5,396,850 A | | 3/1995 | Conochie et al. |
| 5,401,295 A | | 3/1995 | Brotzmann |
| 5,407,461 A | | 4/1995 | Hardie et al. |
| 5,415,742 A | | 5/1995 | La Camera et al. |
| 5,443,572 A | | 8/1995 | Wilkison et al. |
| 5,480,473 A | | 1/1996 | Hardie et al. |
| 5,489,325 A | | 2/1996 | Keogh et al. |
| 5,498,277 A | | 3/1996 | Floyd et al. |
| 5,518,523 A | | 5/1996 | Brotzmann |
| 5,529,599 A | | 6/1996 | Calderon |
| 5,613,997 A | | 3/1997 | Satchell, Jr. |
| 5,640,708 A | | 6/1997 | Conochie et al. |
| 5,647,888 A | | 7/1997 | Keogh et al. |
| 5,741,349 A | | 4/1998 | Hubble et al. |
| 5,800,592 A | | 9/1998 | den Hartog et al. |
| 5,802,097 A | | 9/1998 | Gensini et al. |
| 4,940,488 A | | 8/1999 | Maeda et al. |
| 5,938,815 A | | 8/1999 | Satchell, Jr. |
| 6,143,054 A | * | 11/2000 | Dry ............................ 75/500 |

FOREIGN PATENT DOCUMENTS

| | | | |
|---|---|---|---|
| GB | 2 043 696 A | | 10/1980 |
| GB | 2 088 892 A | | 6/1982 |
| JP | 59-159944 | * | 10/1984 |
| JP | 10-219343 | * | 8/1998 |
| WO | WO 89/01981 | | 3/1989 |
| WO | WO 92/12265 | | 7/1992 |
| WO | WO 93/06251 | | 4/1993 |
| WO | WO 94/19497 | | 9/1994 |
| WO | WO 96/19591 | | 6/1996 |
| WO | WO 96/31627 | | 10/1996 |
| WO | WO 97/17473 | | 5/1997 |
| WO | WO 97/20958 | | 6/1997 |
| WO | WO 97/23656 | | 7/1997 |
| WO | WO 98/27232 | | 6/1998 |
| WO | WO 98/27239 | | 6/1998 |
| WO | WO 99/16911 | | 4/1999 |

* cited by examiner

DIRECT SMELTING VESSEL

The present invention relates to a direct smelting vessel for producing molten metal (which term includes metal alloys) from a metalliferous feed material such as ores and partly reduced ores.

The present invention relates particularly to a vessel that can be used for molten bath-based direct smelting processes.

The term "smelting" is understood herein to mean thermal processing wherein chemical reactions that reduce metal oxides take place to produce liquid metal.

The term "direct smelting process" is understood herein to mean a process that produces a molten metal directly from a metalliferous feed material, such as iron ore and partly reduced iron ore.

The present invention relates particularly to off-gas ducts for direct smelting vessels.

An object of the present invention is to provide an off-gas duct which minimises loss of molten material and solids entrained with off-gas.

According to the present invention there is provided a direct smelting vessel which is adapted to contain a molten bath of metal and slag and includes: a hearth; side walls that extend upwardly from the hearth; a roof; and an off-gas duct extending from an upper section of the vessel for discharging from the vessel an off-gas that is produced during a direct smelting process operated in the vessel, which off-gas duct includes:

(a) a first section which has a relatively slight upward inclination to the horizontal from an inlet end of the first section; and (b) a second section which extends upwardly from an upper end of the first section at a relatively steep inclination to the horizontal.

In use, off-gas is forced to undergo a substantial change in direction in order to enter the first section. It is believed that, as a consequence, molten material and solids that are entrained in the off-gas contact and deposit one: (i) walls of the vessel that are at or in the region of the inlet end; and (ii) walls (particularly upper walls) of the first section at or in the region of the inlet end; and thereby separate from the off-gas. Molten material and solids that deposit on these walls move downwardly into the vessel.

In addition, in use, off-gas flowing along the first section is forced to undergo a substantial change of direction at the end of the first section in order to flow into the second section. Consequently, molten material and solids that are entrained in the off-gas tend to contact and deposit on the upwardly extending wall that is at the end of the first section and separate from the off-gas. It is believed that in this region of the duct, molten material either remains molten or solidifies on the wall. Molten material that remains molten flows downwardly into the first section and then along the first section into the vessel. Molten material that solidifies builds-up on the wall and with deposited solids eventually spalls and falls down into the first section. In view of the relatively higher temperature conditions in the first section the solidified material melts and flows back into the vessel or otherwise is carried by molten material back into the vessel.

The slightly inclined first section avoids the potentially serious problem of solid accretions falling back into the vessel and damaging equipment such as lances/tuyeres while a direct smelting process is being operated in the vessel or after a shut down. Such fall back is also a potentially serious safety issue for persons carrying out maintenance work in the vessel during a shut down.

Preferably the first section is formed having regard to operating conditions in the vessel so that at least a substantial part of the molten material that enters the first section with the off-gas is molten at the end of the slightly inclined first section. This feature ensures that there is minimal built-up of solid accretions in the first section.

More preferably in this regard the first section is formed so that the temperature drop along the length of the first section is less than 100° C. and the overall temperature is maintained above the melting points of the molten material.

Preferably the amount of entrained material (molten and solids) in the off-gas discharged from the second section is less than 15 g, more preferably less than 10 g, per $Nm^3$ off-gas.

Preferably the relatively slight upward inclination of the first section is less than 30°, more preferably less than 20°, to the horizontal.

It is preferred particularly that the angle of inclination be less than 10°.

Preferably the relatively steep inclination of the second section is 80–90° to the horizontal.

Preferably the vessel includes a dead end bend that connects the first and second sections.

Preferably the dead end bend includes an access port in the dead end.

Preferably the vessel includes an off-gas chamber extending upwardly from the roof and the first section of the off-gas duct extends from the off-gas chamber.

Preferably the first section of the off-gas duct extends from a side wall of the off-gas chamber.

Preferably the ratio of the length of the first section to the minimum width dimension of the first section is at least 2:1, where the length of the first section is measured between the intersection of centrelines of the first and second sections and the intersections of the centreline of the first section and a vertical line through the inlet end of the first section. In a situation where there is an off-gas chamber and the first section extends from a side wall of the chamber the intersection of the centreline of the first section and a vertical centreline of the off-gas chamber is the measurement point at the inlet end of the first section.

Typically, the first and second sections are cylindrical and the minimum width dimension of the first section referred to in the preceding paragraph is the diameter of the first section.

Preferably the second section is formed so that the temperature drop along the length of the second section is sufficient to solidify at least a substantial part of any molten material that is in off-gas flowing through the second section before the off-gas reaches the end of the second section. This ensures that there is minimal, if any, carry over of molten material into downstream off-gas processing apparatus, such as hot cyclones and hot scrubbers, that may be affected adversely by molten material in off-gas.

Preferably the off-gas chamber is located centrally.

Preferably the vessel includes at least one lance for injecting oxygen-containing gas into the vessel which extends downwardly through the off-gas chamber into the vessel.

Preferably the ratio of the minimum width dimensions of the side walls of the vessel and the off-gas chamber is at least 1.5:1. In situations where the oxygen-containing gas injection lance or lances extend downwardly through the off-gas chamber, preferably the ratio is 1.5:1 to 2:1. In situations where the gas injection lance or lances are not located to extend through the off-gas chamber the ratio of minimum width dimensions may be up to 4:1.

Preferably the roof is upwardly inclined from the side walls at an angle in the range of 30 to 50° to a horizontal axis (ie an included angle of 120 to 130° measured between the side walls and the roof).

Preferably the angle of inclination is 40° to the horizontal axis.

Preferably the side walls are cylindrical and the roof is frusto-conical and extends from an upper end of the side walls and terminates in the off-gas chamber.

Preferably the minimum width dimension of the side walls of the vessel is 8 meters.

According to the present invention there is also provided a direct smelting process operated in the above-described vessel.

The present invention is described further by way of example with reference to the accompanying drawings, of which:

The following description is in the context of direct smelting iron ore to produce molten iron in accordance with one form of the HIsmelt (Registered Trade Mark) process. It is understood that the present invention is not limited to direct smelting iron ore and is applicable to any suitable metallic ores and concentrates and other metalliferous feed material—including partially reduced metallic ores. It is also understood that the present invention is not limited to the HIsmelt process.

Figure 1:
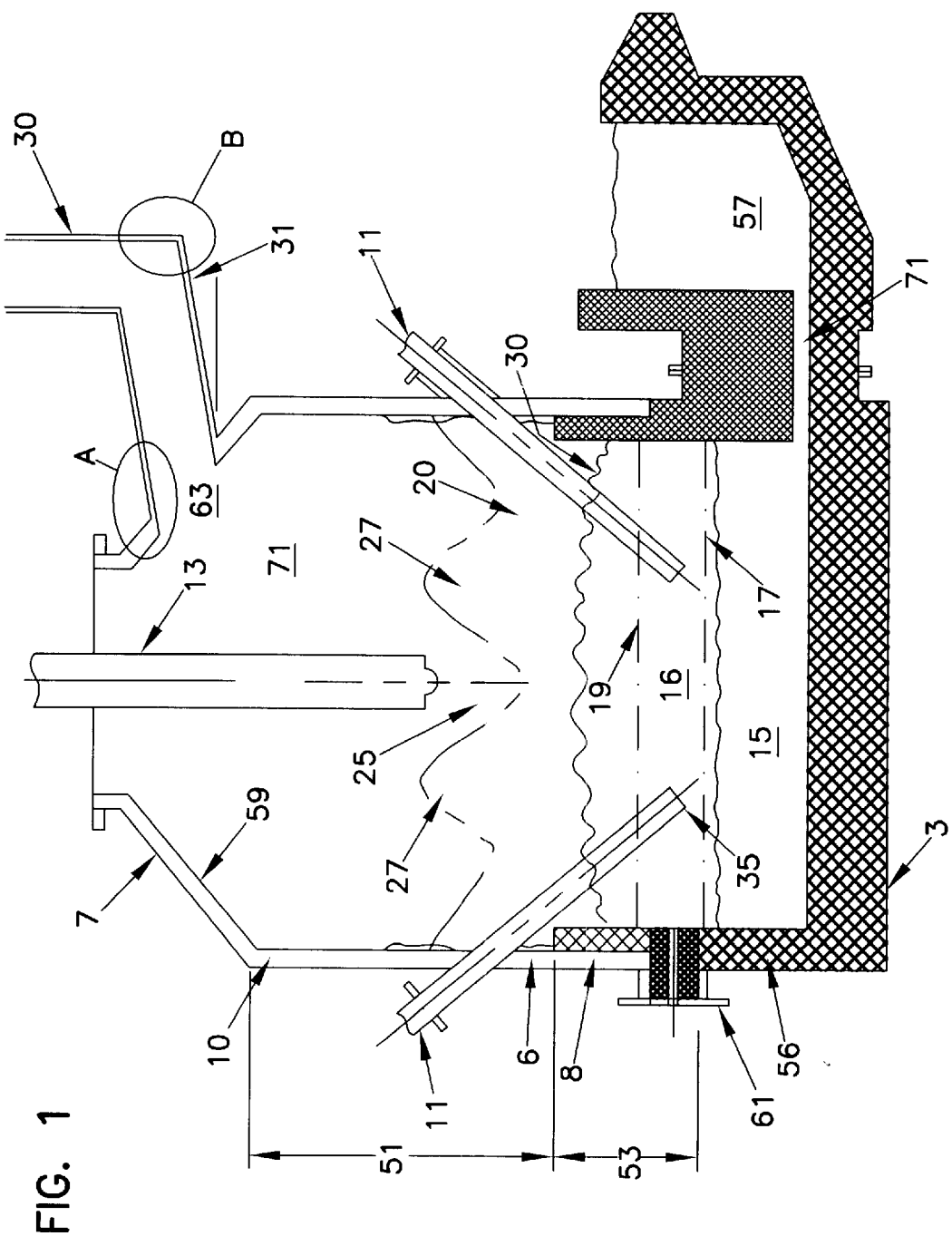
FIG. 1 is a vertical section through a metallurgical vessel illustrating in schematic form one preferred embodiment of the present invention.

The vessel shown in FIG. 1 has a hearth that includes a base 3 and sides 55 formed from refractory bricks; side walls 5 which form a generally cylindrical barrel extending upwardly from the sides 55 of the hearth and which include an upper barrel section 51 and a lower barrel section 53; a roof 7; an off-gas duct 9 extending from an upper section of the vessel; a forehearth 77 for discharging molten metal continuously; and a tap-hole 61 for discharging molten slag.

The off-gas duct 9 includes a slightly upwardly inclined first section 31 that extends from an inlet end 63 at an angle α of 7° to the horizontal and a steep second section 33 that extends vertically from the other end of the first section 31. Both sections 31, 33 are cylindrical.

The first section 31 is formed, having regard to the operating conditions in the vessel and other relevant factors, so that molten material that enters the first section remains molten along the length of the first section. In other words, the first section is formed so that the temperature in the first section, particularly in the region of the wall, is above that at which the molten material solidifies.

The second section 33 is formed so that the temperature drop along the length of the second section is sufficient to solidify at least a substantial part of any molten material that is in off-gas flowing through the second section 33 by the time that the molten material reaches the end of the second section 33.

In use, the vessel contains a molten bath of iron and slag which includes a layer 15 of molten metal and a layer 16 of molten slag on the metal layer 15. The arrow marked by the numeral 17 indicates the position of quiescent surface of the metal layer 15 and the arrow marked by the numeral 19 indicates the position of the quiescent surface of the slag layer 16. The term "quiescent surface" is understood to mean the surface when there is no injection of gas and solids into the vessel.

The vessel also includes 2 solids injection lances/tuyeres 11 extending downwardly and inwardly at an angle of 30–60° to the vertical through the side walls 5 and into the slag layer 16. The position of the lances/tuyeres 11 is selected so that the lower ends are above the quiescent surface 17 of the metal layer 15.

In use, iron ore (typically fines), solid carbonaceous material (typically coal), and fluxes (typically lime and magnesia) entrained in a carrier gas (typically $N_2$) are injected into the metal layer 15 via the lances/tuyeres 11. The momentum of the solid material/carrier gas causes the solid material and the carrier gas to penetrate the metal layer 15. The coal is devolatilised and thereby produces gas in the metal layer 15. Carbon partially dissolves into the metal and partially remains as solid carbon. The iron ore is smelted to metal and the smelting reaction generates carbon monoxide gas. The gases transported into the metal layer 15 and generated via devolatilisation and smelting produce significant buoyancy uplift of molten metal, solid carbon, and slag (drawn into the metal layer 15 as a consequence of solid/gas/injection) from the metal layer 15 which generates an upward movement of splashes, droplets and streams of molten metal and slag, and these splashes, droplets, and streams entrain slag as they move through the slag layer 16.

The buoyancy uplift of molten metal, solid carbon and slag causes substantial agitation in the metal layer 15 and the slag layer 16, with the result that the slag layer 16 expands in volume and has a surface indicated by the arrow 30. The extent of agitation is such that there is reasonably uniform temperature in the metal and the slag regions—typically, 1450–1550° C. with a temperature variation of the order of 30° C.

In addition, the upward movement of splashes, droplets and streams of molten metal and slag—caused by the buoyancy uplift of molten metal, solid carbon, and slag—extends into the space 71 (the "top space") above the molten material in the vessel and forms a transition zone 23.

In general terms, the slag layer 16 is a liquid continuous volume, with gas bubbles therein, and the transition zone 23 is a gas continuous volume with splashes, droplets, and streams of molten metal and slag.

The vessel further includes a lance 13 for injecting an oxygen-containing gas (typically pre-heated oxygen enriched air) which is centrally located and extends vertically downwardly into the vessel. The position of the lance 13 and the gas flow rate through the lance 13 are selected so that the oxygen-containing gas penetrates the central region of the transition zone 23 and maintains an essentially metal/slag free space 25 around the end of the lance 13.

The injection of the oxygen-containing gas via the lance 13 post-combusts reaction gases CO and $H_2$ in the transition zone 23 and in the free space 25 around the end of the lance 13 and generates high temperatures of the order of 2000° C. or higher in the gas space. The heat is transferred to the ascending and descending splashes, droplets, and streams of molten material in the region of gas injection and the heat is then partially transferred to the metal layer 15 when the metal/slag returns to the metal layer 15.

The above described process generates substantial volumes of off-gas which are at temperatures in the range of 1550 to 1650° C. and include entrained molten material and solids. The solids in the entrained material are generally in the form of dust.

The off-gas flows from the top space 71 into the slightly inclined first section 31 of the off-gas duct 9 via the inlet end 63, along the length of the first section 31, around the tight radius corner at the end of this section, and then upwardly through the second section 33. The off-gas undergoes sharp changes of direction at the inlet end 63 of the first section 31 and at the tight radius corner that joins the first and second sections. As is discussed above, these sharp changes of direction cause molten material and solids that are entrained in the off-gas to contact and deposit on the upper wall of the duct in the circled region A and on the end wall of the duct in the circled region B. In the case of region A, it is believed that the deposited molten material remains molten and flows downwardly into the vessel and that the deposited solids are carried by the molten material back into the vessel. In the case of region B, it is believed that part of the molten material remains molten and the remainder of the molten material solidifies. The molten material that remains molten flows down the end wall into the first section 31 and then along the first section 31 and into the vessel. The molten material that solidifies progressively builds up on the wall and eventually spalls and falls down into the first section 31. By forming the first section 31 so that the temperature along the length of the first section is above that at which the molten material solidifies ensures that at least a substantial part of the solidified material melts and flows down the slight incline and into the vessel. The solids that remain solid are carried by the molten material back into the vessel.

The above-described off-gas duct 9 makes it possible to remove substantial amounts of entrained molten material and solids from off-gas with the result that the total amount of entrained material (ie molten material and solids) discharged from the section 33 is kept below 15 g per Nm$^3$ of off-gas. Moreover, the slightly inclined first section 31 avoids the potentially serious problem of solid accretions falling back into the vessel and damaging equipment such as lances/tuyeres while a direct smelting process is being operated in the vessel or after a shut down. Moreover, the slightly inclined first section 31 makes it possible to leave clear the top of the vessel and thereby enable crane access to remove and reposition the oxygen-containing gas injection lance 13 and otherwise allow crane access to the interior of the vessel via the top of the vessel, as may be required during relining operations.

Figure 2:
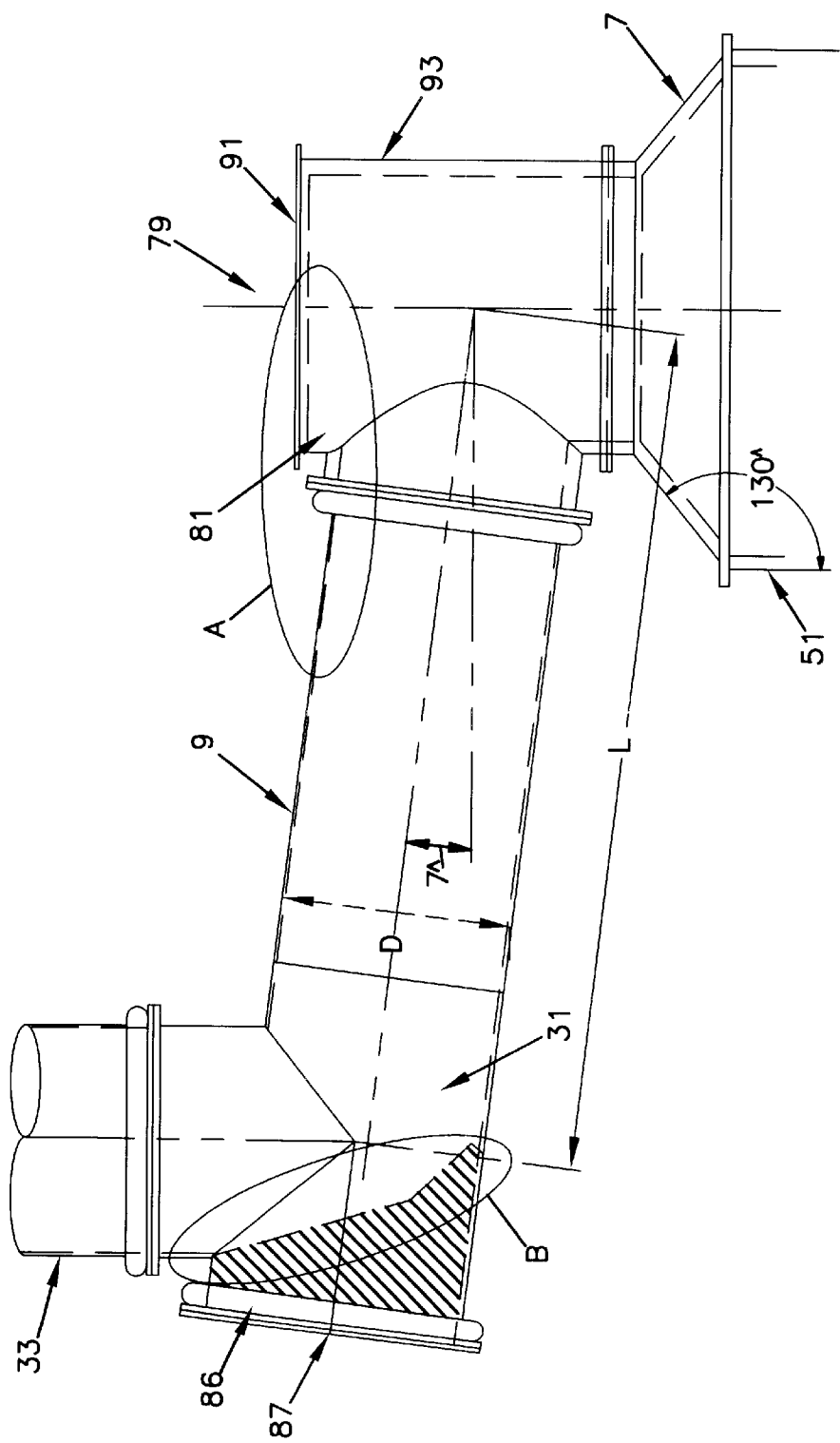
FIG. 2 is a vertical section through an upper section of another metallurgical vessel illustrating another preferred embodiment of the present invention.

The basic components, ie hearth, side walls, roof and off-gas duct, solids injection lances, and oxygen-containing gas injection lance of the vessel shown in FIG. 2 are the same as the vessel shown in FIG. 1. In addition, the basic molten bath-based smelting process operated in the vessel shown in FIG. 2 is the same as that described in relation to FIG. 1. Accordingly, FIG. 2 and the following description of the figure focuses on the differences between two embodiments of the present invention.

With reference to FIG. 2, the vessel includes a cylindrical off-gas chamber 79 which extends upwardly from the roof 7 and the off-gas duct 9 extends from the side wall 93 of the off-gas chamber 79. A top wall 91 of the off-gas chamber 79 is formed as a removable access port to allow access to the vessel.

The off-gas chamber 79 is positioned centrally and, accordingly, the roof 7 is frusto-conical in shape and defines an included angle of 130° with the upper barrel section 51 of the side walls 5 of the vessel. The ratio of the diameters of the upper barrel section 51 and the off-gas chamber 79 is 1.8:1.

Whilst not shown, the oxygen-containing gas injection lance 13 is positioned to extend downwardly through the top wall 91 of off-gas chamber 79.

The first section 31 of the off-gas duct 9 extends at an angle α of 7° to the horizontal and the second section 33 extends vertically from the first section 31.

The dimensions of the first section 31 of the off-gas duct 9 are selected so that the ratio of the length L of the first section 31 (as measured between the intersection of the centrelines of the first and second sections 31, 33 and the intersection of the centreline of the first section and a vertical centreline of the off-gas chamber 79) and the diameter D of the first section 31 is 3.7:1.

In use, off-gas undergoes significant changes of direction in order to enter the first section 31 from the off-gas chamber 79 and in order to enter the second section 33 from the first section. As is described above in relation the FIG. 1 embodiment, these significant changes in direction cause deposition of entrained molten material and solids on exposed surfaces of circled regions A and B and facilitates removal of the entrained material (molten and solids) from off-gas.

The second section 33 of the off-gas duct 9 is positioned in an upper wall of the first section 31 of the off-gas duct 9 so that an end wall 87 of the first section 31 forms a dead end bend and, in use, there is a build-up of entrained material (molten and solids)—as indicated by the shaded section in the figure—which protects the end wall.

In addition, the end wall 87 of the first section 31 of the off-gas duct 9 is formed as a removable access port to allow access to the duct.

Many modifications may be made to the preferred embodiments of the present invention described above without departing from the spirit and scope of the invention.

What is claimed is:

1. A direct smelting vessel which is adapted to contain a molten bath of metal and slag and includes: a hearth; side walls that extend upwardly from the hearth; a roof; an off-gas chamber that extends upwardly from the roof, the off-gas chamber having an upwardly extending side wall; and an off-gas duct extending from the side wall of the off-gas chamber for discharging from the vessel an off-gas that is produced during a direct smelting process operated in the vessel, said off-gas duct includes:

(a) a first section which has an off-gas inlet positioned in an upper section of the vessel so that off-gas is forced to undergo a substantial change of direction to enter the first section, the first section having an upward inclination of greater than 0° and less than 30° to the horizontal; and (b) a second section which extends upwardly from an upper end of the first section at a relatively steep inclination to the horizontal whereby in use off-gas flowing through the duct undergoes a substantial change of direction on flowing from the first section into the second section.

2. The vessel defined in claim 1 wherein the slight upward inclination of the first section is greater than 0° and less than 20° to the horizontal.

3. The vessel defined in claim 2 wherein the angle of inclination of the first section is less than 10° to the horizontal.

4. The vessel defined in claim 1 wherein the steep inclination of the second section is 80 to 90° to the horizontal.

5. The vessel defined in claim 1 wherein the ratio of the length of the first section to a minimum width dimension of the first section is at least 2:1, where the length of the first section is measured between the intersection of centerlines of the first and second sections and the intersection of the centerline of the first section and a vertical line through the inlet end of the first section.

6. The vessel defined in claim 1 includes a dead end bend that connects the first and second sections.

7. The vessel defined in claim 6 wherein the dead end bend includes an access port in the dead end.

8. The vessel defined in claim 1 wherein the ratio of the minimum width dimensions of the side walls of the vessel and of the off-gas chamber is at least 1.5:1.

9. The vessel defined in claim 1 wherein the ratio of the length of the first section to the minimum width dimension of the first section is at least 2:1, where the length of the first section is measured between the intersection of centerlines of the first and second sections and the intersections of the centerline of the first section and a vertical centerline of the off-gas chamber.

10. The vessel defined in claim 1 wherein an upper end of the off-gas chamber defines a dead end bend.

11. The vessel defined in claim 1 wherein the off-gas chamber is located centrally.

12. The vessel defined in claim 1 includes at least one lance for injecting oxygen-containing gas into the vessel which extends downwardly through the off-gas chamber into the vessel.

13. The vessel defined in claim 1 wherein the roof is upwardly inclined from the side walls at an angle in the range of 30 to 50° to a horizontal axis.

14. The vessel defined in claim 13 wherein the angle of inclination is 40° to the horizontal axis.

15. The vessel defined in claim 1 wherein the roof is upwardly inclined from the side walls at an angle in the range of 30 to 50° to a horizontal axis.

16. The vessel defined in claim 15 wherein the side walls are cylindrical and the roof is frusto-conical and extends from an upper end of the side walls and terminates in the off-gas chamber.

17. The vessel defined in claim 1 wherein the minimum width dimension of the side walls of the vessel is 8 meters.

* * * * *